United States Patent [19]

Westover et al.

[11] 3,862,345

[45] Jan. 21, 1975

[54] PROCESS FOR REMOVING THE PEELS FROM COOKED MASHED POTATOES WHICH MAY SUBSEQUENTLY BE DEHYDRATED

[75] Inventors: Jack D. Westover, Burnsville; Elmars M. Kiploks, Minneapolis, both of Minn.

[73] Assignee: The Pillsbury Company, Minneapolis, Minn.

[22] Filed: Oct. 11, 1973

[21] Appl. No.: 405,337

Related U.S. Application Data

[63] Continuation of Ser. No. 17,443, March 9, 1970, abandoned.

[52] U.S. Cl. ............... 426/262, 426/321, 426/372, 426/472, 426/473, 426/481, 426/482, 426/483
[51] Int. Cl. ............................ A23b 7/03, A23l 1/12
[58] Field of Search .... 426/262, 321, 328, 370, 372, 426/464, 465, 472, 473, 478, 479, 481, 482, 483, 148; 99/585; 241/93

[56] References Cited
UNITED STATES PATENTS

| | | | |
|---|---|---|---|
| 4,337 | 12/1845 | Edwards | 426/464 |
| 1,025,373 | 5/1912 | Cooke | 426/464 |
| 1,295,162 | 2/1919 | Heimerdinger | 426/464 |
| 1,327,254 | 1/1920 | Remmers | 99/585 |
| 1,480,984 | 1/1924 | Bell | 426/482 |
| 1,571,945 | 2/1926 | Heimerdinger | 426/148 |
| 3,024,823 | 3/1962 | Hyde | 241/93 |
| 3,261,695 | 7/1966 | Sienkiewicz | 426/464 |

OTHER PUBLICATIONS
Potato Processing, Talburt & Smith (2nd ed.) 1967, Air Publishing Co., 1967.

*Primary Examiner*—A Louis Monacell
*Assistant Examiner*—Martin G. Mullen
*Attorney, Agent, or Firm*—James V. Harmon; M. D. Ellwein

[57] ABSTRACT

Fresh potatoes are washed, sliced into slabs and cooked until they reach a consistency which allows them to be mashed. The potatoes are preferably treated with an agent that will prevent graying of the cortex and thereafter placed between a pair of perforated pressing drums which are rotated toward one another to force the cooked edible portion of the potato through either or both of the perforated elements and collect the peel on the perforated surfaces. The peel is removed from the surfaces of said drums and the edible portion of the potato is dried.

6 Claims, 8 Drawing Figures

WHOLE POTATOES ARE WASHED AND SLICED TO PIECES WHICH CAN BE UNIFORMLY COOKED IN ABOUT 20 MINUTES (E.G.) 5/8" THICK.

↓

INSPECTION & REMOVAL OF UNDESIRABLE PIECES.

↓

BLANCH IN WATER PREFERABLY CONTAINING DISCOLORATION INHIBITOR E.G. $SO_2$ & SAPP AT ABOUT 165° F. FOR ABOUT 20 MINUTES TO SWELL STARCH GRANUALES WITHOUT APPRECIABLE SOFTENING OF POTATOES.

↓

COOL TO LESS THAN ABOUT 70°F. & HOLD FOR AT LEAST 15 MINUTES.

↓

EXPOSE TO ATMOSPHERIC STEAM FOR ABOUT 20 MINUTES TO COOK.

↓

PRESS BETWEEN PERFORATED MEMBERS TO REMOVE PEELING.

↓

INTRODUCE ANTIOXIDANTS COLOR PRESERVATIVES & EMULSIFIERS.

↓

DRY AND FLAKE.

FIG. 1

INVENTOR.
JACK D. WESTOVER
BY ELMARS M. KIPLOKS

*James V. Harmon*
ATTORNEY

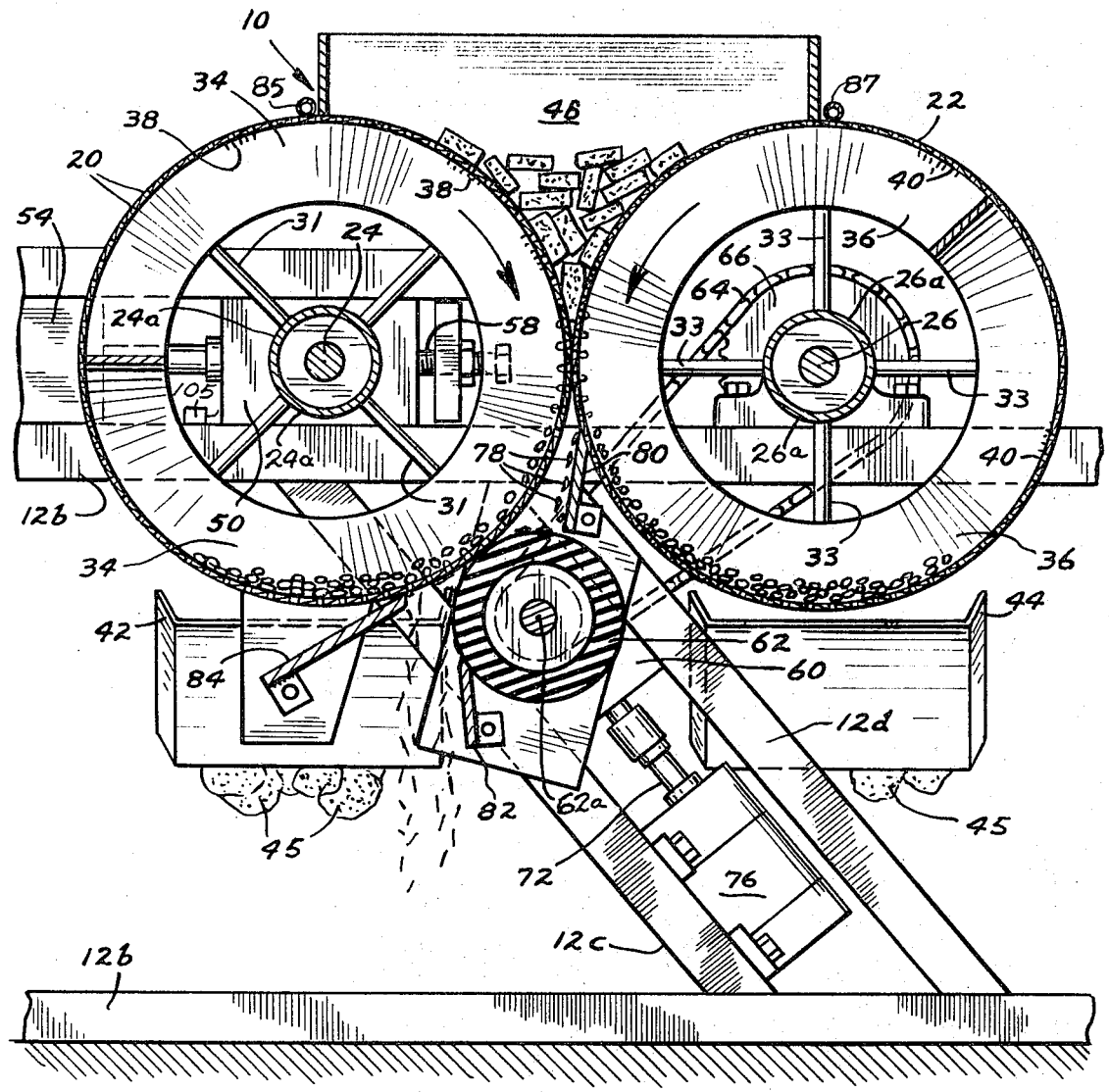
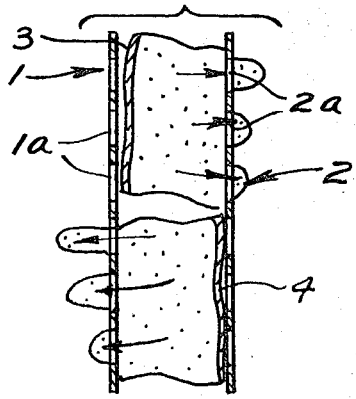
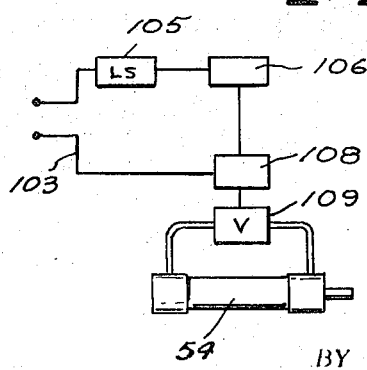

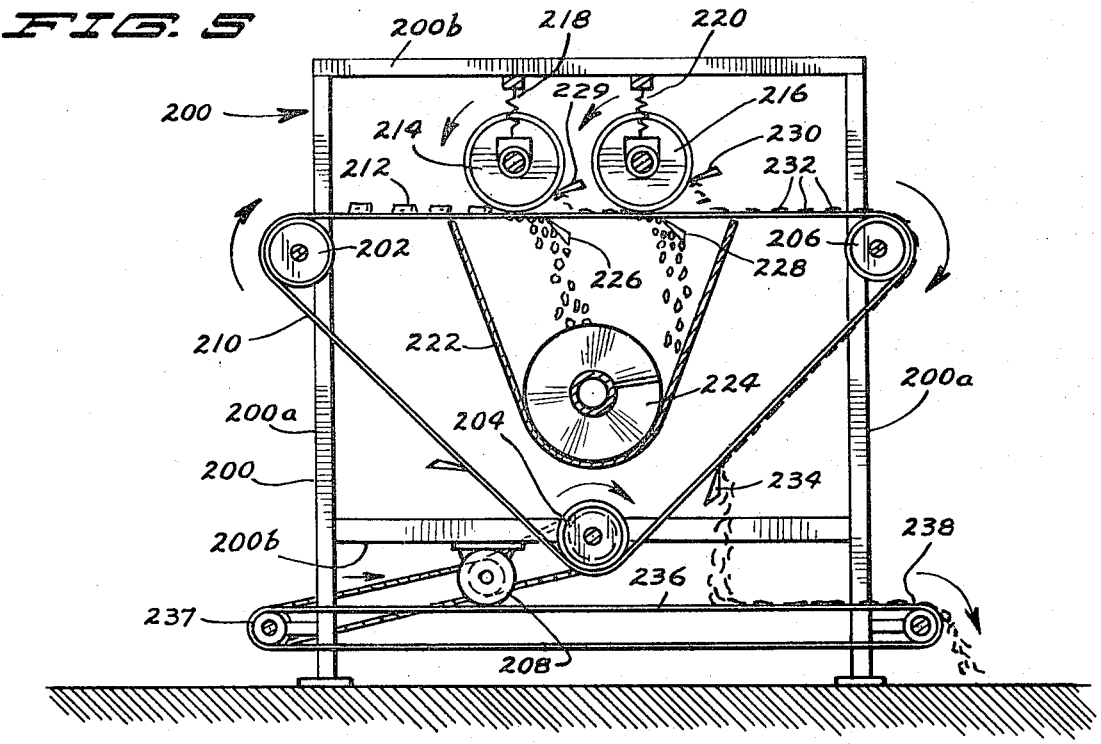
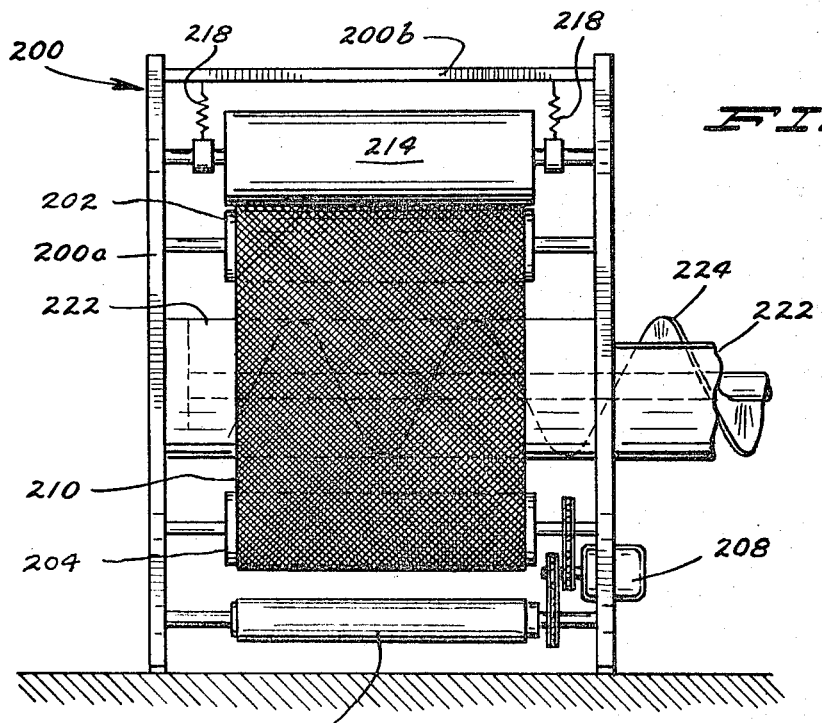

PROCESS FOR REMOVING THE PEELS FROM COOKED MASHED POTATOES WHICH MAY SUBSEQUENTLY BE DEHYDRATED

This is a Continuation, of application Ser. No. 17,443, filed Mar. 9, 1970, now abandoned.

The present invention relates to the preparation of food products and more particularly to the dehydration of potatoes.

The overall objective of the invention is to provide a means for effectively removing the peel in preparing dehydrated potatoes. In potato dehydration processes currently used, the peel is softened by lye or steam treatment and removed by abrasion and washing or by abrasion alone. In lye peeling, up to about 20 to 35 percent of the product is lost as waste and the presence of lye tends to make the final product slightly yellow in color. Moreover, because the outer portion of the potato has a higher solids content, the loss of this portion of the potato is the most detrimental from the standpoint of solids loss.

The pollution of streams and rivers is such a serious problem that in recent years it has become the focus of national attention. In some cases, pollution is due in part to material introduced into streams from food processing plants. In the case of a fruit or vegetable peeling process, it is not uncommon to expel thousands of gallons of water per day containing as much as 0.75 percent solids composed of cellular material which has been removed from the surfaces of the food products being processed and often a chemical treating agent such as sodium hydroxide. Since both of these materials are difficult to economically remove from the waste water, it is ordinarily expelled directly into a stream or river without any further treatment.

If a portion of the peel is removed as a paste, it is so highly contaminated with lye that it is not fit for use as feed unless neutralized but the resulting salt content will render it inedible. Thus, the removal of this sludge is an item of additional expense, costing as much as $2 per ton.

In addition to the water pollution problem, the prior processing methods resulted in a substantial economical loss. For example, assuming the potato is 20 percent solids, if a 30 percent peel loss is experienced and the potatoes cost $1.50 per 100 pounds an added expense of 3 cents will result for each pound of finished dried flakes plus approximately 0.1 cent per pound to dispose of the waste lye-contaminated peel.

In accordance with the present invention, peels are removed by forcing the edible portion of the potato through a sieve element. While a number of processes have been previously proposed for ricing cooked potatoes by forcing them through a screen or perforated plate, the the distinction from these prior processes and the present invention can be easily seen when it is kept in mind that peel separation and the yield of usable potato is not a problem in the former process.

Another problem inherent in prior processing techniques is the inability to reliably remove dry rot which if allowed to pass into the finished product will contaminate the product with black specks.

Another problem encountered in preliminary work leading to the invention was a gray discoloration of the potato due to the presence of the peel during the cooking and mashing operation. This made the resulting dehydrated potato appear unwholesome and detracted from its general appeal as a food product.

In view of these and other deficiencies in the prior art, it is an object of the present invention to provide an improved process for dehydrating the potatoes with the following characteristics and advantages: (a) an improvement in yield and specifically a reduction by at least 50 percent in the amount of edible material lost as compared with lye peeling; (b) a more specific object is to improve the yield of finished product so that no more than 15 percent by weight is lost in commercial practice; (c) a further object of the invention is the provision of an improved process for preparing dehydrated potatoes in which no chemicals are required for softening the potato skin before the skin is removed; (d) the ability to provide an uncontaminated waste that can be used for animal or human food; (e) the ability to reduce liquid waste; (f) an improved apparatus in which provision is made to prevent the transferred peelings through sieves used for removing the peel; (g) a provision for severing the connection between the peel and potato which passes into the openings of the sieve through which the potato is pressed; and (h) the ability to remove eyes and dry rot from potatoes without cutting deeply into the cortex of the potato.

These and other more detailed and specific objects will be apparent in view of the following specification and claims wherein:

FIG. 1 is a chart showing the steps performed in a preferred embodiment of the invention.

FIG. 4 is a vertical sectional view taken on line 4—4 of FIG. 3.

FIG. 5 is an elevational view of another embodiment of the invention.

FIG. 6 is an end elevational view of the apparatus of FIG. 5.

FIG. 7 is a diagram illustrating the peel removal principle, and

FIG. 8 is a schematic diagram of the roll separation mechanism.

Figure 2:
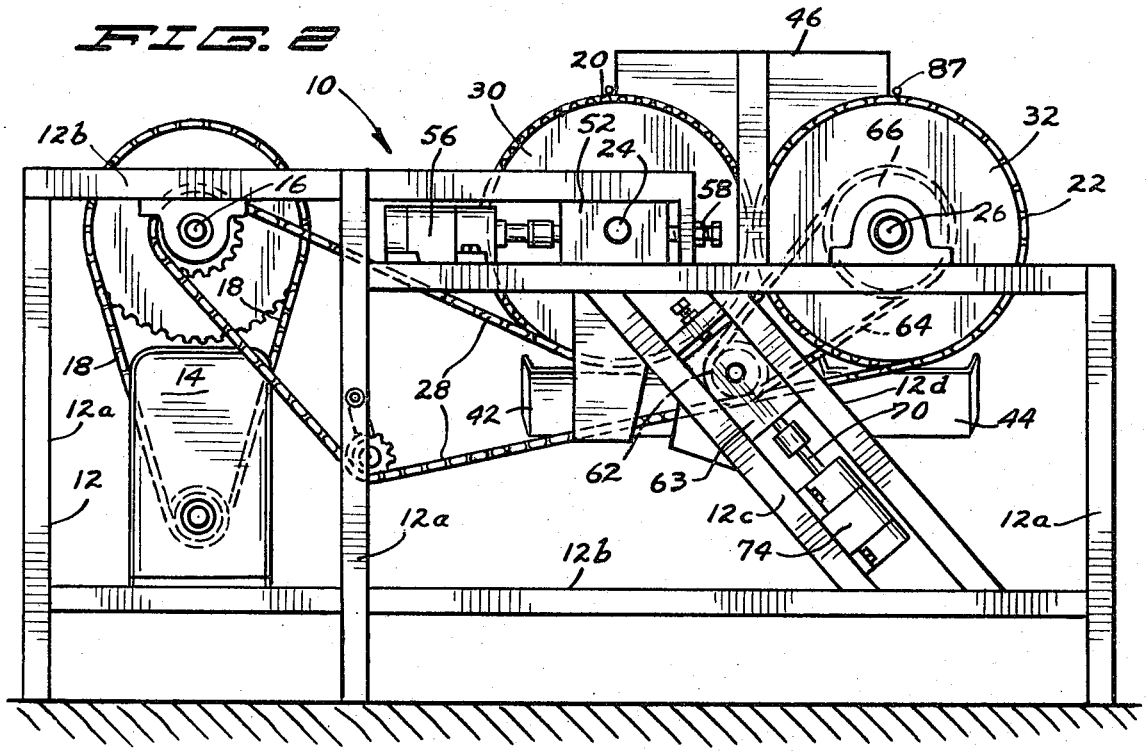
FIG. 2 is a side elevational view of an apparatus embodying the invention.

Briefly, in accordance with the present invention, potatoes are cooked until they have reached a mash consistency. They are then subjected to pressure by perforated elements having openings in them to force edible portions of the potato through the openings and collect the peel on the surfaces of the perforated elements. The perforated elements preferably comprise parallel cylinders which are driven in opposite directions so that successive portions converge toward one another. Also, in accordance with one form of the invention, the peels having been separated from the edible portion of the potato are subjected to further pressure for the purpose of removing additional edible potato from them. Further, in accordance with a preferred embodiment of the invention, a cortex discoloration inhibitor is introduced to prevent a gray color from forming which is believed to be due to the presence of metal ions present in the peel and in the portions of the cortex adjacent to the peel.

To the accomplishment of the foregoing and related ends, the invention then comprises the features hereinafter fully described and particularly pointed out in the claims, the following description setting forth in detail certain illustrative embodiments of the invention, these being indicative, however, of but a few of the various ways in which the principles of the invention may be employed.

While the invention is applicable to all varieties of white potatoes, process details such as times and temperatures may vary from one variety to another. The invention will, however, be described in connection with Pontiac white potatoes.

While the invention is particularly useful in preparing a dehydrated potato product that can be reconstituted to provide a mashed potato product, the invention is also useful in preparing potato pieces for the manufacture of french fries and the like. In this application, the center portion of the potato is removed and sliced into pieces of the size desired for making french fries. The outer portion of the potato is then processed in accordance with the present invention.

The process of the invention will now be described with reference to FIG. 1. Whole potatoes are first washed and sliced into pieces which can be cooked uniformly. This is accomplished by slicing them into slabs of uniform thickness. Pieces of any thickness can be used but from about ¼ inch to an inch thick are preferred. Pieces of about one-half to three-fourths inch thick are usually used. Pieces ⅝ inch thick perform admirably. These pieces are then inspected and undesirable pieces are removed. The sliced potatoes are then subjected to heat in the presence of moisture for a sufficient period of time to swell without gelatinizing (causing an outflow of starch from cells) the starch granules and without appreciably softening the potatoes. In hot water at 165°F. this can be accomplished in about 15 to 25 minutes with 20 minutes being preferred for pieces that are about five-eighths inches thick. It should be understood that at higher temperatures, the starch granules can be swelled in less time but if the temperature is too high, for example above 185°F., the starch cells on the outside of each piece may rupture before the starch granules in the interior of the piece are swollen. At lower temperatures, such as 150°F., swelling to the desired degree will require a longer period of time. Likewise, with thicker pieces, the blanching step will require more time.

To prevent starch gelatinization which if present will result in a pasty product, the pieces are preferably cooled to less than about 100°F. and preferably 70°F. or less, and held at that temperature for a sufficient period of time to have a uniform temperature throughout. In a preferred form of the invention, the pieces are cooled to 70°F. and held for about 20 minutes to assure temperature equilibration. While the reaction which occurs during cooling is not known with certainty, it is believed to cause retrogradation of the amylose fraction of the starch to render it sufficiently elastic to prevent rupturing of the starch cells during subsequent heating. In any event, the result is that cooling will enable the starch cells to be further cooked without becoming ruptured.

The pieces are then cooked for just sufficient time to soften them to the point where they can be mashed (herein referred to as a "mash consistency"). This condition can be tested by placing a piece of potato between the fingers and applying pressure. If the bonds between the potato cells are weakened sufficiently for the piece to be squashed without hard lumps being present, the mash consistency has been reached.

If atmospheric steam is employed for cooking, about 15 to 25 minutes is required for pieces five-eighths inch thick. About 15 minutes is required for pieces one-half inch thick and about 25 minutes with pieces about three-fourths inch thick. In all cases, the uniform thickness of the slices assures the desired degree of cooking throughout each piece.

The potato should not be cooked past the mash consistency since to do so will cause the finished product to be pasty or glue-like.

It was found that when potatoes are blanched with their skins on, the cortex portion of the potato becomes gray in color. We have discovered that discoloration inhibiting chemicals can be used to prevent this color change. Sulphur dioxide is preferred, particularly with regard to cost and effectiveness. When sodium bisulfite is used to liberate sulphur dioxide, it is used in an amount that will maintain the $SO_2$ concentration at about 2,000 parts for each one million parts of water. Although the mechanism of the color removal is not known with certainty, it is believed to react with elemental iodine or iron present as well as with other minerals. In addition to sulphur dioxide, other materials can be used, such as sodium acid pyro-phosphate, ethylenedinitrilo tetraacetic acid, hereinafter referred to as "EDTA," in the amount of about 0.066 percent by weight of the blanch water, and phosphoric acid in an amount necessary to bring the blanch water to a pH between about 4.0 and 4.5. composition, be capable of effectively preventing undesirable discoloration and that the residual amounts remaining in the potato after processing be edible in the quantities present. All quantities given herein are in parts by weight.

As can be seen by reference to FIG. 7, the invention contemplates the provision of first and second pressing elements 1 and 2 provided with opening 1a and 2a respectively, a means is provided for forcing the pressing elements toward one another so as to press the edible portions of the cooked potato through the openings. It will be seen that by providing openings in both the pressing elements, the edible portion of the potato will flow as seen in the upper portion of FIG. 7 from left to right through the openings in perforated element 2 since the peel 3 is abutting against the first pressing element. In the case of the piece having its peel 4 abutting against the pressing element 2, the potato will flow through the openings in pressing element 1. In this way, the skin itself will not be forced through the openings in either of the pressing elements regardless of how the piece is oriented. Pressing elements 1 and 2 can be forced together in a variety of ways. For example, they can move toward one another along a straight line normal to their surfaces but preferably form portions of cylinders which are positioned in parallel tangentially adjacent relationship and mounted for rotation such that portions of the cylinders converge toward one another as the cylinders are rotated on their own axes. An apparatus of this kind will now be described in connection with FIGS. 2 through 7.

An important advantage of the invention is a reduction in product loss by at least 50 percent of that which occurred in the prior practice. By this is meant that when processing 100 lbs. of raw potato using the lye peeling method, about 30 pounds is lost but, using the present process, it is possible to achieve only a 15 pound loss including the peel for each 100 pounds of potatoes processed.

Figure 3:
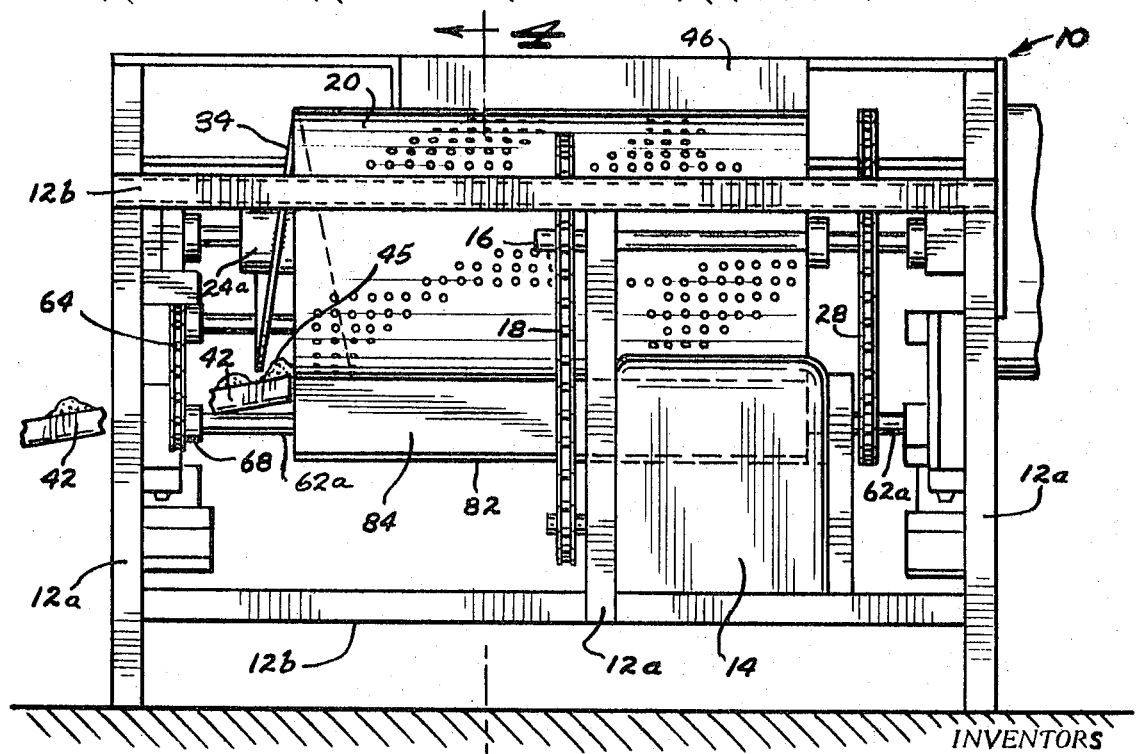
FIG. 3 is a side elevational view of FIG. 2.

Refer now to FIGS. 2, 3 and 4 which illustrate a preferred form of peeler in accordance with the invention.

The peeler indicated by the numeral 10 is supported upon a steel framework 12 composed of columns 12a and horizontal cross members 12b. Two pairs of inclined cross members 12c and 12d, one pair on each side of the apparatus, are used for supporting certain of the rolls and associated mechanism as will be described hereinbelow.

Supported upon the framework 12 is an electric drive motor 14 which drives a stub shaft 16 through a chain and sprocket assembly indicated generally at 18. The shaft 16 in turn rotates parallel tangentially adjacent perforated peeling drums 20 and 22 which are mounted rigidly upon shafts 24 and 26 respectively through a single endless drive chain 28 which is entrained under a chain sprocket 30 affixed to the shaft 24 and over a sprocket 32 affixed to the shaft 26. The chain 28 will cause the drum 20 to turn in a clockwise direction and drum 22 to turn in a counter-clockwise direction as seen in FIGS. 2 and 4. A speed differential between the drums 20 and 22 insures that the ligaments of edible potatoes within the openings in drums 20 and 22 are severed. To produce a speed differential between the drums, sprocket 30 is provided with 72 teeth and sprocket 32 with 70 teeth. In a typical application of the invention, the drums 20 and 22 rotate at about 12 RPMs and are 18 inches in diameter. About 120 pounds of potatoes are passed between the rolls per minute. While the size of the openings of the drums can be varied considerably, it has been found that perforations in a stainless steel drum (12 gauge stainless steel) can be about nine sixty-fourths inches in diameter on about 3/16 inch centers.

Mounted concentrically over the shafts 24 and 26 rigidly secured thereto is a pair of tubes 24a and 26a respectively which extend the entire length of the drums 20 and 22. Extending radially from the tubes 24a and 26a are spokes 31 and 33 respectively which are affixed as by welding at their outward ends to helical auger flights 34 and 36 respectively. The flights are rigidly secured as by welding 38 and 40 respectively to the inner surface of the drums 20 and 22. The flights are oriented in the proper direction to auger the potato solids within the drums toward the left in FIG. 3 to a pair of collection chutes 42 and 44 that carry the edible portion of the potato to drying or other processing equipment. An open bottomed box or hopper 46 is placed on top of the rolls to define edge dams as well as front and rear dams for the potatoes being introduced between the drums 20 and 22.

As shown in FIGS. 2 and 4, the drum 22 is mounted for rotation on pillow blocks supported by the cross members 12d of the framework while the shaft 24 of the drum 20 is mounted in sliding bearing blocks 50 and 52 yieldably biased toward drum 20 with any amount of force desired by means of pneumatic cylinders 54 and 56. In a typical operation, drum 20 is pressed against drum 22 with a total force of about 40 pounds. Stops 58 are used for limiting the movement of the blocks 50 and 52 toward the drum 22 beyond a predetermined position to provide a gap, e.g., 0.010 inches, between the drums which is a little less than a single layer of potato peel. If the gap is too wide, excessive loss of potato will occur. Similarly, if the dimensions of the outside of the drum are not accurately maintained, or if surface irregularities are present, excessive waste will result. If old potatoes having thicker skins are used, the gap should be increased somewhat to accommodate them. It is important to note that most of the potatoes become oriented as they pass downwardly into the gap between the drums 20 and 22 such that at least one cut surface lies adjacent to one of the perforated drums.

Mounted for rotation between blocks 60 and 63 which are in turn mounted for sliding movement between the diagonal frame members 12c and 12d is a laterally extending resiliant element such as a rubber pressing roll 62 which is driven by a chain 64 that extends downwardly from a sprocket 66 to sprocket 68 (FIG. 3) on the shaft 62a of roll 62. As seen in FIGS. 2 and 4, the blocks 60 and 63 are connected through shafts 70 and 72 to pneumatic cylinders 74 and 76 respectively which yieldably bias the roll 62 against the lower inward surface of the drum 20 to thereby press the peels 78 that have accumulated on the surface of drum 20 and those that are removed from drum 22 by laterally extending doctor blade 80 (FIG. 4) against the drum 20 a second time. In this way, a part of the residual edible material that clings to the peel 78 is pressed into the openings of the drum thereby improving the overall yield.

Any peelings that adhere to the drum 62 are removed by a doctor blade 82. The peelings that adhere to the drum 20 are removed by a laterally extending doctor blade 84. As can be seen in FIG. 4, a pair of laterally extending air knives 85 and 87 are mounted just above and in alignment with drums 20 and 22 respectively. Compressed air periodically introduced through these pipes is expelled through a multiplicity of openings located on the bottom of the pipe to thereby remove edible potato that adheres to the inside surfaces of the drums.

The edible potato product 45 is augered by the flights within the drums to the chutes 42 and 44 and conveyed to any suitable wellknown equipment used for drying potatoes. If dried flakes are to be prepared, a drier such as that described in U.S. Pat. No. 3,355,304 can be used.

Refer now to FIG. 8 with reference to the preferred form of control mechanism employed for separating the rolls in the event a foreign object such as a stone is introduced. Current is supplied by conductors 101 and 103 to a limit switch 105, timer 106, and solenoid 108 connected to an air valve 109 which is in turn coupled by air pipes 110 and 111 to both of the air cylinders 54 and 56 only one of which is shown. In operation, a slight separation of the drums will actuate limit switch 105 which in turn will operate solenoid 108 for about two seconds. This will shift valve 109 so as to introduce air on the proper side of the piston of cylinder 154 to cause the drum 20 to be retracted 3 or 4 inches away from drum 22. At the end of the 2 second period as controlled by timer 106, valve 109 will be returned to its normal operating condition thereby shifting air pressure back into line 110 to thereby move the drum 20 to its normal operating position as described above. By this time, the foreign object will have passed between the rolls without causing damage.

In FIGS. 5 and 6 which illustrate another form of peel remover is shown a supporting framework 200 composed of vertical columns 200a and cross pieces 200b suitably connected as by welding. Three parallel rolls 202, 204 and 206 are mounted for rotation on the framework and driven by means of a motor 208. Entrained over rolls 202-206 is a flexible sieve such as screen 210 having openings of about 10 mesh.

In operation, the potato pieces prepared as described above after being cut, blanched and cooked are placed as shown at 212 on the horizontal section of the screen 210 entrained between rolls 202 and 206 and are carried from left to right in the FIG. 5 beneath a pair of laterally oriented horizontally disposed pressure applying rolls 214 and 216 which are yieldably biased downwardly onto the screen 210 by springs 218 and 220 so as to force the edible portion of the potato through the openings in screen 210 into an auger trough 222 in which a spiral flighted auger 224 is provided for the purpose of conveying the potato to a take-away conveyor or the like (not shown). The potato solids are removed from the under surface of screen 210 by doctor blades 226, 228 while the peels are removed from the pressure applying rolls by doctor blades 229 and 230. The peels 232 travel on the outer surface of the screen and are removed by a doctor blade 234 and allowed to fall onto a peel conveyor 236 entrained between rolls 237 and 238.

The performance and acceptability of the finished dried product prepared in accordance with the invention was compared with reconstituted dehydrated potatoes prepared in the conventional manner by lye peel removal. In these tests from 80 to 90 consumers were given samples of the product for evaluation. The dehydrated potatoes were reconstituted and evaluated in the homes of the persons making the evaluation. The results of these consumer acceptance tests are summarized in Table 1.

TABLE 1

Overall Acceptability
Reconstituted Dehydrated Potatoes

| | Lye Removed Peel | Invention | |
|---|---|---|---|
| Heavy Users | 6.6 | 7.0 | 9 is best |
| Light Users | 6.7 | 7.0 | on a 9 |
| Total | 6.65 | 7.0 | point scale |
| | Flavor Acceptability Lye Removed Peel | Invention | |
| Heavy Users | 4.3 | 4.6 | 6 is best |
| Light Users | 4.3 | 4.5 | on a 6 point scale |

By reference to the Table it will be seen that the invention has produced no impairment of flavor or overall acceptability compared with potatoes prepared by the lye peel removal process. There has, in fact, been a general trend in the direction of improvement with the average evaluation by those tested for the lye removed peel being 6.65 on a 9 point scale compared with an average of 7.0 for potatoes made using the invention.

An even more significant improvement is the improvement in overall yield which has been reduced from an average loss of from about 30 percent to about 15 percent. Moreover, the waste peel is not contaminated with lye and as a result can be used for animal or human food. While the improvement in yield achieved is due in part from not having to soften the outer portion of the potato with lye, it is also due in part to pressing of the peels against the drum in two stages and in part to the speed differential between the drums that effects the shearing action which separates the ligaments of potato extending into the openings from the adjacent peel.

It was also surprising to find that the eyes and dry rot was effectively separated from the edible portion of the potato along with the peel as the potato passed between drums 20 and 22.

A further advantage to the invention is the relatively small quantity of solids extracted during processing; about 1 to 2.5 percent of the potatoes introduced.

Still another benefit is a slight but significant improvement in protein content of the resulting product.

The drastic reduction in river pollution made possible through the use of the invention as compared with lye peeling, in which conventional water washing is used to remove the lye soaked potatoes, can be as much as several tons a day in a large potato processing plant.

The economic advantage of the invention in a typical application may well result in a saving of about 3 cents per pound of dry potato flakes.

The invention will be better understood by reference to the following examples.

EXAMPLE I

Whole white potatoes are washed and sliced to ⅝ inch thick slabs, inspected for the removal of undesirable pieces and transferred to a blanching tank containing an aqueous color removal solution at 165°F. composed of $SO_2$ in a concentration of 2,000 parts per million parts of water by weight and sodium acid pyrophosphate in the amount of 0.275% by weight. If continuous processing is used, enough sodium bisulfite and SAPP is added periodically to maintain the $SO_2$ and SAPP concentration at the desired level. The potatoes are held in the solution for 20 minutes to swell the starch granules without appreciably softening the potatoes. The potatoes are then removed from the tank, cooled to 65°F. and held at this temperature for 15 minutes. They are then cooked by exposure to steam at atmospheric pressure for 20 minutes and passed between the rolls 20 and 22 which are set with a clearance of 0.01 inches and run at a speed of about 12 RPM. Half of the potato will transfer into drum 20 and half into drum 22. At this point, a solution of emulsifiers such as calcium stearyl-2 lactylate in the amount of 0.05 percent of the final product and distilled monoglycerides in the amount of 0.1 percent of the final product are introduced. The resulting mashed potato is then transferred to a drying drum of the kind shown in FIGS. 4 and 5 of U.S. Pat. No. 3,355,304 and dried as described therein to form flakes. The resulting dried potato when reconstituted had a taste, texture and color similar to that of freshly cooked potato and a protein content of about 7½ percent.

EXAMPLE II

A dried potato product is prepared as in Example I except that the cortex discoloration inhibitor consists of phosphoric acid added to the blanch water to bring the pH between 4.0 and 4.5 and ethylenedinitrilo tetraacetic acid added in an amount equivalent to 0.066 percent of the blanch water.

EXAMPLE III

Potatoes are prepared as in Example II except that citric acid is used in place of phosphoric acid.

EXAMPLE IV

Potatoes are prepared as in Example III except that malic acid is used in place of citric acid.

We claim:

1. A process for preparing a dehydrated potato product wherein the potatoes are peeled with a pair of cylindrical pressing drums mounted in parallel tangentially adjacent relationship, both of the pressing drums having openings therein, said process comprising placing pieces of cooked potato having peel on them between the pressing drums, rotating both of the drums with the rotation of one of the drums being at a higher surface speed than the other to provide a shearing action for severing the ligaments of edible potato that extend through the openings from the adjacent peeling thereby forcing cooked edible portions of the potato, except the peel, through the openings in the drums and retaining the peelings on the surface of the drums, whereby the speed differential provided by the different surface speeds of the drums is adapted to increase the yield of the process by removing an additional fraction of the potato from the peel and thereafter drying the mashed potato by exposing the potato mash to a drying medium to obtain a non-pasty dehydrated potato.

2. The method of claim 1 wherein the potatoes are exposed to a cortex discoloration inhibitor agent prior to passing between the pressing elements to prevent the discoloration of the edible portions of the potato that pass through the openings when the potatoes are cooked before removal of the peels.

3. A process of preparing a dehydrated potato product wherein the potatoes are peeled with a pair of parallel pressing drums having openings through them and being mounted adjacent to one another for rotation upon their longitudinal central axes, the process comprising cutting the potatoes into pieces that are about one-fourth to three-fourths of an inch in thickness, blanching the cut potatoes in water sufficiently warm to swell the starch granules without appreciably softening the potatoes, exposing the potatoes to a cortex discoloration inhibiting agent prior to mashing the potatoes, cooling the potatoes to a temperature of about room temperature or lower, thereafter exposing the potatoes to sufficient heat to cook them to the point where they reach a consistency capable of being mashed, placing the cooked potatoes having peel on them between the pressing drums, rotating the pressing drums in opposite directions, whereby successive portions of the drums converge toward one another thereby forcing the cooked portions other than the peel of the potato through the openings therein, retaining the peels on their surfaces and thereafter dyring the mashed potato by exposing the potato mash to a drying medium to obtain a non-pasty dehydrated potato and the surfaces of the drums travel at different speeds, whereby shearing action is provided between the drums for severing the ligaments of edible potato that extend through the openings from the adjacent peelings.

4. A process of preparing potatoes wherein the center portion of the potato is removed and sliced into pieces for making french fried potatoes or the like, the remaining outer portions of the potatoes are then further processed to prepare a dehydrated potato product wherein the potatoes are peeled with a pair of parallel pressing drums having openings through them and being mounted adjacent to one another for rotation upon their longitudinal central axes, said process comprising blanching said remaining outer portions of the potatoes in water sufficiently warm to swell the starch granules without appreciably softening the potatoes, exposing the potatoes to a cortex discoloration inhibiting agent prior to mashing the potatoes, cooling the potatoes to a temperature of about room temperature or lower, thereafter exposing the potatoes to sufficient heat to cook them to the point where they reach a consistency capable of being mashed, placing the cooked potatoes having peel on them between the pressing drums, rotating the pressing drums in opposite directions, whereby successive portions of the drums converge toward one another thereby forcing the cooked portions other than the peel of the potato through the openings therein, retaining the peels on their surfaces and thereafter drying the mashed potato by exposing the potato mash to a drying medium to obtain a non-pasty dehydrated potato.

5. A method of processing potatoes wherein the potatoes are peeled with a pair of cylindrical pressing drums mounted in parallel tangentially adjacent relationship, both the pressing drums having openings therein, said process comprising placing pieces of cooked potato having peel on them between the pressing drum, rotating both of the drums with the rotation of one of the drums being at a higher surface speed than the other to provide a shearing action for severing the ligaments of edible potato that extend through the openings from the adjacent peeling thereby forcing cooked edible portions of the potato, except the peel, through the openings in the drums and retaining the peelings on the surface of the drums, whereby the speed differential provided by the different surface speeds of drums is adapted to increase the yield of the process by removing an additional fraction of the potato from the peel.

6. A method of preparing potatoes wherein the center portion of the potato is removed and sliced into pieces for making french fried potatoes or the like, the remaining outer portions of the potatoes are then further processed to prepare a mashed potato product wherein the potatoes are peeled with a pair of parallel pressing drums having openings through them and being mounted adjacent to one another for rotation upon their longitudinal central axes, said process comprising cooking said remaining outer portions of said potatoes to the point where they reach a consistency capable of being mashed, placing the thus cooked outer portions of the potatoes having peel on them between the pressing drums, rotating the pressing drums in opposite directions whereby successive portions of the drums converge toward one another thereby forcing the cooked portions other than the peel of the potatoes through the openings therein and thereafter removing the peels from the surfaces of the drums.

* * * * *